United States Patent [19]

Hurley et al.

[11] Patent Number: 5,764,907
[45] Date of Patent: Jun. 9, 1998

[54] COMPUTER TO MICROCOMPUTER INTERFACE

[75] Inventors: Harlan S. Hurley, Huntsville; Gary M. Herda, Decatur, both of Ala.

[73] Assignee: Chrysler Corporation, Auburn Hills, Mich.

[21] Appl. No.: 324,208

[22] Filed: Oct. 17, 1994

[51] Int. Cl.$^6$ .................................................... H01J 13/00
[52] U.S. Cl. ........................ 395/200.46; 395/200.42; 395/200.43; 395/200.44; 395/308; 395/200.8; 395/200.62; 395/853; 395/477; 365/221
[58] Field of Search .................................. 395/200, 287, 395/288, 285, 308, 856, 857, 858, 859, 200.12, 200.14, 200.19, 825, 851, 852, 853, 878, 200.09, 200.42, 200.43, 200.44, 200.46, 200.47, 200.49

[56] References Cited

U.S. PATENT DOCUMENTS

| | | | |
|---|---|---|---|
| 4,669,044 | 5/1987 | Houser et al. | 395/821 |
| 4,780,814 | 10/1988 | Hayek | 395/308 |
| 4,933,835 | 6/1990 | Sachs et al. | |
| 4,933,845 | 6/1990 | Hayes | |
| 5,003,461 | 3/1991 | Fritsche | 395/200.01 |
| 5,051,890 | 9/1991 | Nagasaki et al. | 395/200.46 |
| 5,057,998 | 10/1991 | Hirokawa | 364/200 |
| 5,070,443 | 12/1991 | Priem et al. | 395/726 |
| 5,089,951 | 2/1992 | Iijima | 395/275 |
| 5,091,846 | 2/1992 | Sachs et al. | |
| 5,107,251 | 4/1992 | Frank et al. | 340/709 |
| 5,129,073 | 7/1992 | Murakami et al. | 395/425 |
| 5,150,363 | 9/1992 | Mitchell | 370/112 |
| 5,150,467 | 9/1992 | Hayes et al. | |
| 5,255,375 | 10/1993 | Crook et al. | 395/309 |
| 5,255,384 | 10/1993 | Sachs et al. | |
| 5,276,887 | 1/1994 | Haynie | 395/733 |
| 5,325,492 | 6/1994 | Bonevento et al. | 395/200.01 |
| 5,339,395 | 8/1994 | Pickett et al. | 395/309 |
| 5,428,760 | 6/1995 | Ghori et al. | 395/425 |
| 5,456,407 | 10/1995 | Stalsberg et al. | 236/46 |
| 5,488,318 | 1/1996 | Vajapey et al. | 326/46 |
| 5,488,572 | 1/1996 | Belmont | 395/306 |
| 5,495,593 | 2/1996 | Elmer et al. | 395/430 |
| 5,497,474 | 3/1996 | Todorovich | 395/429 |
| 5,613,070 | 3/1997 | Born | 395/200.15 |
| 5,613,141 | 3/1997 | Szatkowski et al. | 395/800 |

*Primary Examiner*—Glenn A. Auve
*Assistant Examiner*—Raymond N. Phan
*Attorney, Agent, or Firm*—Roland A. Fuller, III

[57] ABSTRACT

A serial interface for facilitating communication between an outside computer and a microcontroller located on a printed circuit board enables the computer to read the contents of a RAM location or write to any RAM location in the microcontroller. The methodology used in association with this invention is preferably utilized across a two-wire asynchronous bus where one of the lines is dedicated to transmissions from the microcontroller and the other line is dedicated to transmissions from the computer to the microcontroller.

14 Claims, 1 Drawing Sheet

COMPUTER TO MICROCOMPUTER INTERFACE

BACKGROUND OF THE INVENTION

Various systems and software protocol exist for interfacing two computers. Typical systems include a plurality of buslines and/or sophisticated logic in order to facilitate communication between two computers. Other conventional systems include handshake schemes for communication between one source, such as a host computer, and one or more destinations, such as microprocessors remote from the host computer. In typical handshake schemes, sophisticated timing protocol is necessary in order to ensure that signals are properly propagated along the various buslines. Such timing protocol can be unsatisfactory because it restricts the speed of signal transmission along the various communication lines. Handshaking schemes that include timing protocol are especially unsatisfactory in systems having very fast bus operation systems.

Other conventional systems use reconfiguration of bus systems in order to permit communication between a remote device and a host computer. Such reconfiguration has disadvantages associated with it. For example, the information has to be transmitted along the bus lines in cycles. In many reconfiguration systems, typical reconfiguration is to convert a synchronous bus into an asynchronous bus. A cycle can be completed only if no parity errors are encountered and there are no restrictions such as a previous read lock on a particular busline.

It is therefore desirable to provide an efficient and less complicated interface to facilitate communications between an outside computer and a microcontroller, especially microcontrollers located on a printed circuit board. This invention addresses the need for a cost efficient and effective interface.

SUMMARY OF THE INVENTION

In most general terms, this invention provides a methodology for interfacing a computer with a microcontroller on a remote printed circuit board using two buslines in an asynchronous, two-wire bus system.

The preferred protocol used in association with this invention includes a methodology for communicating between an outside computer and a microcontroller random access memory that includes three basic steps. The first step is to transmit an access signal from the computer to the remote microcontroller, using one wire of the two-wire asynchronous bus. The second step is determining a response step to be performed by the microcontroller, using the information contained in the access signal from the first step. Then a response step is performed, using the microcontroller, and the response step selected from one of three potential responses. First, the response step could be loading data transmitted from the computer into the random access memory when the access signal indicates that the computer will write data to the random access memory. Second, the response step can be transmitting preselected contents from the random access memory to the computer when the access signal indicates that the computer will read data from the random access memory. Third, the operating status of the microcontroller can be altered when the access signal corresponds to a command signal indicating that the operating status of the microcontroller should be altered.

DETAILED DESCRIPTION OF THE PREFERRED EMBODIMENTS

Figure 1:
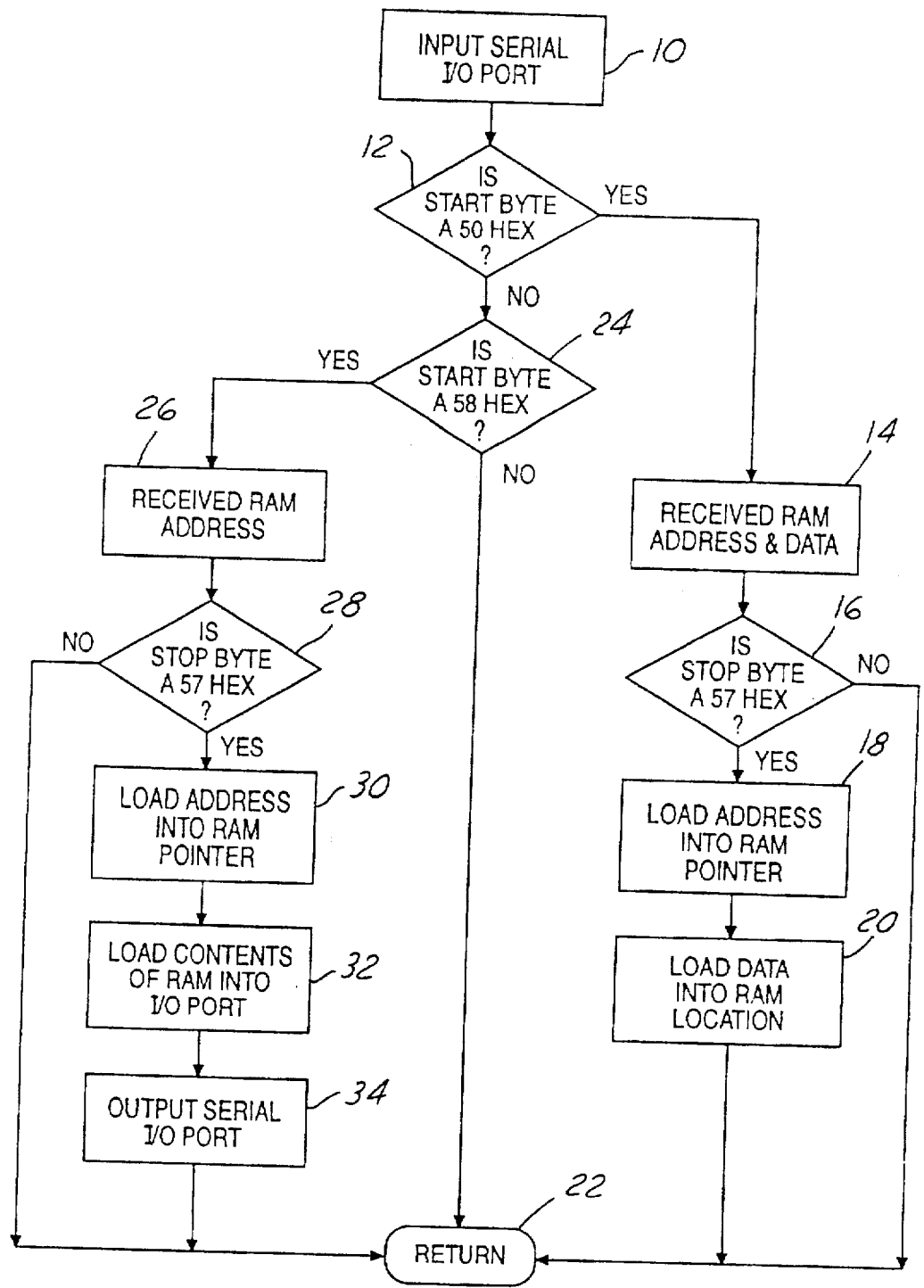
FIG. 1 illustrates a flow chart diagram of the preferred methodology used in association with this invention.

This invention provides a serial interface that facilitates a unique communication system between an outside computer and a microcontroller located on a printed circuit board. The preferred embodiment of the protocol associated with this invention enables a computer to read the contents of any RAM location or write to any RAM location in the microcontroller. A preferred embodiment includes the use of a two-wire asynchronous bus for communication between the outside computer and the microcontroller. One line of the two-wire bus is used exclusively to transmit data from the microcontroller to the computer. The other line is preferably dedicated to receiving information in the microcontroller that originates from the outside computer. In the preferred embodiment, no handshaking lines are used. All information transmitted between the computer and microcontroller is preferably in hexadecimal format and all bytes are eight bits long. The information transmitted from the outside computer to the microcontroller preferably includes the least significant bit being sent first, includes one start bit and one stop bit and there is no parity.

FIG. 1 is a flow chart diagram of the preferred methodology used in association with this invention. FIG. 1 illustrates the inventive protocol used to interface a remotely located computer and a microcontroller on a printed circuit board. Step 10 includes transmitting an access signal to the input/output port of the microcontroller. At Step 12, the access signal is checked in order to determine whether it is a signal indicating that the computer will read information from the RAM or write information to the RAM. According to the preferred embodiment, if the start byte is assigned the number 50 in hexadecimal format, then the computer will write information to the RAM. In the preferred embodiment, the access signal corresponding to writing information from the computer to the RAM on the microcontroller begins with a start byte followed by the address of the RAM that is to be changed followed, in turn, by the data that is to be put into the RAM. Lastly, a stop byte, preferably having a hexadecimal value of 57, is sent. In preferred embodiment, all signals are in hexadecimal format. Accordingly, the illustrated step 14 indicates that if the start byte is a 50 in hexadecimal format, the RAM address and the data to be put into that address is received. Step 16 provides a check for whether the transmitted information should actually be loaded into the RAM address indicated by the signal. If the stop byte has a hexadecimal value equal to 57, then the address is loaded into the RAM pointer 18. Next, at 20, the data is loaded into the appropriate RAM location. After the data is loaded into the RAM location, the system returns, at 22, to normal operation.

In the event that a RAM address and data is received at 14 and the stop byte is not a hexadecimal 57, then the system returns to normal operation at 22.

In the preferred embodiment, a hexadecimal 58 start byte corresponds to an access signal indicating that the outside computer will read the contents of a preselected RAM address. This is indicated by the decision step at 24. If the start byte is a hexadecimal 58, then the address of the RAM is received at 26. In the preferred embodiment, the stop byte is a hexadecimal 57 to indicate that the signal is indeed a "read from the RAM" access signal. Accordingly, at 28 the decision is made to determine whether the stop byte is a hexadecimal 57. At 30, the address, from which the information is to be read, is loaded into the RAM pointer. At 32 the contents of that portion of that RAM are loaded into the input/output port of the microcontroller on the printed circuit board. At 34, the information is output from the input/output port of the microcontroller and transmitted to the computer across the second line or wire of the two-wire asynchronous bus that is preferably used in connection with this invention. After the information is transmitted to the computer, the system returns at 22 to normal operation.

In the preferred embodiment, an access signal that indicates that the computer will read information from the RAM has the following characteristics. The start byte is a hexadecimal 58 then the address, containing the information in the RAM, is sent in hexadecimal format followed, in turn, by a stop byte. In the preferred embodiment, the microcontroller sends eight bits, the contents of the RAM, to the computer across the second line of the two-wire asynchronous bus. In the preferred embodiment, the first line of the two-wire bus is dedicated to transmitting information from the computer to the microcontroller and the second line is dedicated to transmitting information from the microcontroller to the computer.

The system and protocol associated with this invention also facilitates sending commands to a microcontroller. In the preferred embodiment, a control signal in the form of a hexadecimal byte is sent to the microcontroller mailbox. In the preferred embodiment, the mailbox of the microcontroller is a RAM location that receives command signals directing the microcontroller software to perform four functions. First, placing the microcontroller into the halt mode upon receipt of a first command signal. Second, the software program initializes the microcontroller when a second command signal is received in the mailbox RAM location. Third, all input from the input/output pins of the printed circuit board are ignored when a third command signal is received. Lastly, when any other command signal is sent to the microcontroller mailbox, that is any command signal other than the first, second or third signals referenced above, the microcontroller will read and update all RAM keyread locations and analog/digital RAM locations. After the microcontroller is reset by the software or the reset pin, the number in the mailbox of the microcontroller is preferably equal to the version number of the software program.

The preceding description is exemplary rather than limiting in nature. Variations and modifications will become apparent to those skilled in the art that do not depart from the purview and spirit of this invention. The scope of this invention will be limited only by the appended claims and all fair legal equivalents thereof.

What is claimed is:

1. A method of communicating between an outside computer and a microcontroller having a random access memory, using a two wire asynchronous bus, comprising the steps of:

(A) transmitting an access signal from the computer to the microcontroller, using a first wire of the two wire asynchronous bus;

(B) determining a response step to be performed by the microcontroller, using the access signal from step (A); and (C) performing a response step, using the microcontroller, said response step being from a group consisting of (1) loading data transmitted from the computer into the random access memory, using the first wire of the two wire asynchronous bus when the access signal indicates that the computer will write data to the random access memory; (2) transmitting preselected contents from the random access memory to the computer, using a second wire of the two wire asynchronous bus when the access signal indicates that the computer will read data from the random access memory; and (3) altering an operating status of the microcontroller when the access signal corresponds to a command signal.

2. The method of claim 1, wherein step (A) is performed by the substeps of:

transmitting a start byte, using the first wire of the two wire bus; and transmitting a preselected address of the random access memory in hexadecimal format.

3. The method of claim 1, wherein step (B) is performed by the substeps of determining whether the access signal indicates that the computer will write data to the random access memory.

4. The method of claim 3, wherein step (C) is performed by performing the response step (2) from step (C).

5. The method of claim 4, wherein response step (2) is performed by the further substeps of determining a preselected address location within the random access memory indicated by the access signal, loading the preselected address into a random access memory pointer in the microcontroller and loading data into the preselected address location, said data being transmitted from the computer across the first wire.

6. The method of claim 1, wherein step (B) is performed by the substeps of determining whether the access signal indicates that the computer will read data from a preselected address location within the random access memory.

7. The method of claim 6, wherein step (C) is performed by performing the response step (1) from step (C).

8. The method of claim 7, wherein response step (1) is performed by the further substeps of determining a preselected address location within the random access memory indicated by the access signal, loading the preselected address location into a random access pointer, transmitting contents from within the preselected address location to the computer using the second wire.

9. The method of claim 1, wherein step (C) is performed by performing the response step (3) from step (C).

10. The method of claim 9, wherein response step (3) is performed by the further substeps of initializing the microcontroller when the access signal indicates that the microcontroller is to be initialized.

11. The method of claim 9, wherein response step (3) is performed by the further substeps of placing the microcontroller into a halt mode when the access signal indicates that the microcontroller is to be halted.

12. The method of claim 9, wherein response step (3) is performed by the further substeps of reading and updating keyread locations within the random access memory when the access signal indicates that the keyread locations are to be updated.

13. The method of claim 9, wherein response step (3) is performed by the further substep of ignoring all inputs from input/output pins of a printed circuit board having the microcontroller.

14. A method of interfacing an outside computer with a microcontroller on a printed circuit board, using a two wire asynchronous bus, comprising the steps of:

transmitting an access signal from the computer to the microcontroller, using a first wire of the two wire bus, the access signal dictating a response to be performed by the microcontroller;

defining a first response to be performed by the microcontroller that includes sending data from a preselected random access memory in the microcontroller to the computer, using a second wire of the two wire bus;

defining a second response to be performed by the microcontroller that includes receiving data from the computer, using the first wire, and placing the data into a preselected random access memory in the microcontroller;

determining whether the access signal dictates that the first response is to be performed;

determining whether the access signal dictates that the second response is to be performed; and performing a response step from a set of response steps consisting of the first and second response steps.

* * * * *